United States Patent
Takeguchi et al.

(10) Patent No.: US 7,678,490 B2
(45) Date of Patent: Mar. 16, 2010

(54) POLYMER ELECTROLYTE FUEL CELL

(75) Inventors: Shinsuke Takeguchi, Osaka (JP); Kazuhito Hatoh, Osaka (JP); Hiroki Kusakabe, Sakai (JP); Hideo Ohara, Katano (JP); Soichi Shibata, Hirakata (JP); Takeshi Tomizawa, Ikoma (JP)

(73) Assignee: Panasonic Corporation, Osaka (JP)

( * ) Notice: Subject to any disclaimer, the term of this patent is extended or adjusted under 35 U.S.C. 154(b) by 1192 days.

(21) Appl. No.: 10/820,160

(22) Filed: Apr. 8, 2004

(65) Prior Publication Data

US 2004/0247986 A1 Dec. 9, 2004

(30) Foreign Application Priority Data

Apr. 9, 2003 (JP) ............................. 2003-104917

(51) Int. Cl.
*H01M 8/02* (2006.01)
*H01M 8/10* (2006.01)

(52) U.S. Cl. .......................................... 429/38; 429/30

(58) Field of Classification Search ................... 429/30, 429/38
See application file for complete search history.

(56) References Cited

U.S. PATENT DOCUMENTS

| | | | |
|---|---|---|---|
| 4,508,793 A * | 4/1985 | Kumata et al. ............... 429/26 |
| 5,158,837 A * | 10/1992 | Misawa et al. ............... 429/34 |
| 5,846,668 A | 12/1998 | Watanabe | |
| 5,853,909 A | 12/1998 | Reiser | |
| 6,007,933 A | 12/1999 | Jones | |
| 6,015,633 A | 1/2000 | Carlstrom, Jr. et al. | |
| 6,150,049 A | 11/2000 | Nelson et al. | |
| 6,207,306 B1 | 3/2001 | Sederquist | |
| 6,303,245 B1 | 10/2001 | Nelson | |
| 6,500,580 B1 | 12/2002 | Marvin et al. | |
| 6,723,463 B2 * | 4/2004 | Sugita et al. ................... 429/38 |
| 2002/0086195 A1 | 7/2002 | Gorman et al. | |
| 2002/0182474 A1 | 12/2002 | Saito | |
| 2003/0008189 A1 | 1/2003 | Katagiri et al. | |
| 2003/0104265 A1 * | 6/2003 | Yoshimoto et al. ............ 429/38 |

(Continued)

FOREIGN PATENT DOCUMENTS

EP 1 220 347 A2 7/2002

(Continued)

OTHER PUBLICATIONS

Japanese Office Action issued in Japanese Patent Application No. JP 2004-071148 dated Aug. 20, 2009.

*Primary Examiner*—Dah-Wei Yuan
*Assistant Examiner*—Karie O'Neill Apicella
(74) *Attorney, Agent, or Firm*—McDermott Will & Emery LLP

(57) ABSTRACT

A polymer electrolyte fuel cell is provided with a conductive separator having one or more gas flow channels for supplying and exhausting a gas to and from an electrode of the fuel cell. The gas flow channels are connected to and in fluid communication with an inlet manifold on the separator. The cell also includes a gas supply connection in fluid communication with the inlet manifold of the separator. Water accumulation in the cell can be advantageously reduced by configuring the connections to the inlet manifold so that the lowermost part of any gas flow channel connections with the inlet manifold is above the uppermost part of the gas supply connection to the inlet manifold.

6 Claims, 8 Drawing Sheets

U.S. PATENT DOCUMENTS

| | | |
|---|---|---|
| 2003/0118881 A1 | 6/2003 | Walshi et al. |
| 2003/0129468 A1 | 7/2003 | Issacci et al. |
| 2003/0186106 A1 | 10/2003 | Frank et al. |
| 2004/0038100 A1 | 2/2004 | Cargnelli et al. |

FOREIGN PATENT DOCUMENTS

| | | |
|---|---|---|
| EP | 1 246 282 A1 | 10/2002 |
| EP | 1 378 953 A1 | 1/2004 |
| EP | 1 403 947 A2 | 3/2004 |
| EP | 1 422 776 A1 | 5/2004 |
| JP | 2001-006715 | 1/2001 |
| JP | P2002-343400 | 11/2002 |
| JP | P2003-223922 | 8/2003 |
| WO | WO 03/088395 A1 | 10/2003 |

* cited by examiner

F I G. 1 3
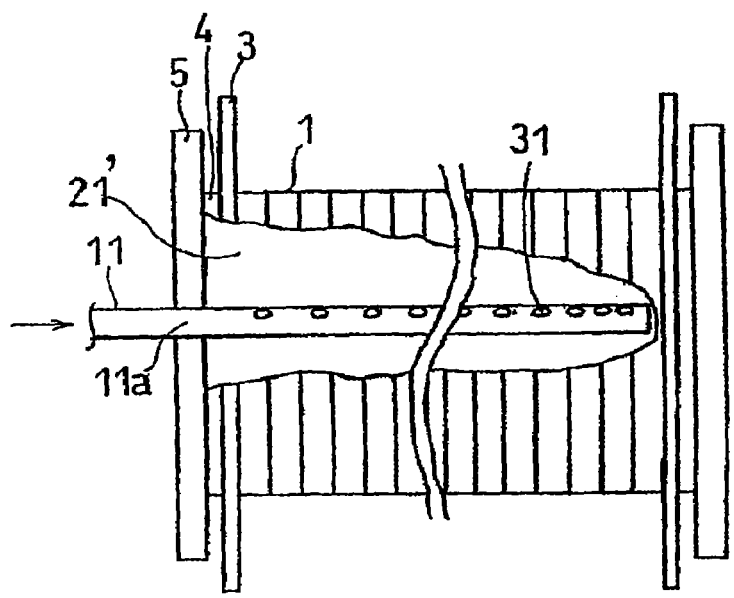

POLYMER ELECTROLYTE FUEL CELL

BACKGROUND OF THE DISCLOSURE

The present invention relates to a fuel cell and more particularly to a fuel cell including a solid polymer electrolyte for use in portable power sources, electric vehicle power sources, domestic cogeneration systems and the like.

A fuel cell using a solid polymer electrolyte causes an electrochemical reaction between a fuel gas, such as hydrogen, and an oxidant gas, such as oxygen in air, to simultaneously generate electric power and heat. Typically, such a fuel cell includes a polymer electrolyte membrane for selectively transporting ions and a pair of electrodes arranged to sandwich the membrane. Each of the electrodes includes a catalyst layer mainly composed of carbon powder carrying a platinum metal catalyst thereon and a gas diffusion layer having both gas permeability and electron conductivity formed on the surface of the catalyst layer.

In order to prevent the supplied fuel gas and oxidant gas from leaking out of the fuel cell or the two gases from mixing, a gas seal or a gasket is arranged to sandwich the polymer electrolyte membrane on the periphery of the electrodes. The gas seal or the gasket is integrated in advance with the electrodes and the membrane. This assembly is known as MEA (membrane-electrode assembly). Next to the MEA, a conductive separator plate is arranged to mechanically secure the MEA and electrically connect the MEA with an adjacent MEA in series. In part of the separator plate contacting the MEA, a gas flow channel is formed to supply a reaction gas or exhaust generated gas or excessive gas to and from the electrode surface. The gas flow channel may be provided independently from the separator, but typically, a groove is formed on the surface of the separator plate which functions as the gas flow channel.

To supply a reaction gas to the grooves of the separator plates in a fuel cell, a pipe for supplying the gas is diverged into branches in a number corresponding to the number of the separators used. Therefore, a jig for connecting the branches to the grooves, respectively, is required. This jig is called a manifold. In particular, a manifold connecting the pipe and the grooves directly as mentioned above is called an external manifold. Another manifold of a simpler structure is called an internal manifold. The internal manifold can consist of a hole penetrating the separators. Inlets of the gas flow channels are formed to communicate with the hole, from which the reaction gas is directly supplied to the gas flow channels.

The hole should have a cross sectional area that is larger than the total cross sectional area of the gas flow channels of the combined separator plates. If the hole area is too small, a pressure loss in the manifold results and increases during the gas supply, thereby increasing the workload required for the gas supply which can be satisfied by using a blower or the like. As a result, the overall system may decrease in efficiency. In order to avoid such a problem and the unwanted pressure loss in the manifold, a larger area is required for the hole.

A fuel cell generates heat during operation. Therefore, it is preferable to cool the fuel cell to keep it within a suitable temperature condition. In general, a cooling section through which a cooling medium is passed is inserted between the separators in every one to three cells. In most cases, the cooling section is provided by forming a cooling medium flow channel on the rear surface of the separator plate. To form a common cell stack, the MEAs and the separators are can be arranged to form a stack of 10-200 cells. Then, an end plate is arranged on each end of the cell stack with an intervening current collector plate and an insulating plate. The cell stack and plates can be secured with fastening rods at the both ends.

As conventional fuel cells, Japanese Laid-Open Patent Publication No. 2002-343400 proposes a fuel cell in which a gas supply or exhaust pipe is arranged so that the bottom of the pipe's inner wall is positioned at the same level as or lower than the bottom of the manifold penetrating the separator plates. Further, Japanese Laid-Open Patent Publication No. 2003-223922 proposes a fuel cell in which an outlet (exhaust) manifold is vertically elongated so that the manifold communicates with an outlet of the gas flow channel at an upper part thereof and connected with a gas exhaust pipe at a lower part thereof.

Typical polymer electrolyte materials include polymers having perfluoro sulfonic acid and perfluoro sulfonate groups. In membrane form, this class of materials develop ion conductivity when they contain moisture and, thus, the fuel gas and oxidant gas are usually humidified before supplying the gases to the cell. However, if the supplied gas is humidified to have a dew point higher than the operation temperature of the fuel cell, condensation occurs in the gas flow channel or inside the electrode and, in extreme circumstances, accumulates water in the fuel cell. Additional water can accumulate because the reaction on the cathode side generates water. As a result, the performance of the fuel cell becomes unstable or deteriorated. Such a phenomenon caused by too much moisture, in which deterioration in fuel cell performance and unstable operation occur, is called flooding. If this phenomenon occurs on the anode side, a shortage of the fuel gas occurs, which is fatal to the fuel cell. More specifically, if the fuel cell is forced into operation in a state where the fuel gas is lacking, carbon associated with the anode catalyst reacts with water in the atmosphere to generate electrons and protons. Accordingly, carbon is leached from the catalyst layer, destroying the catalyst layer of the anode. Therefore, flooding on the anode side is of significant importance.

If the fuel cell is used for a power generation system, procedures including the humidification of the supply gas need to be systematized. For the purposes of obtaining a simple system and improving efficiency thereof, it is preferable to humidify the supply gas to have a dew point as low as possible. Therefore, in general, the supply gas is humidified to have a dew point slightly lower than the fuel cell temperature so as to avoid flooding, improve the system efficiency and simplify the system.

However, in order to achieve higher performance of the fuel cell, the polymer electrolyte membrane needs to be improved in ion conductivity. For that purpose, it is preferable to humidify the supply gas to have almost 100% relative humidity or higher. In view of durability of the polymer electrolyte membrane, it is also preferable to supply the gas with high humidity.

If the gas is humidified to have the relative humidity of almost 100%, the supplied gas causes condensation with a high possibility in the upstream of the fuel cell stack. The condensed water is then supplied to the stack in a mist state. If the separator plate surface is arranged parallel to the gravity direction and the inlet manifold for the gas supply is provided in an upper part of the separator plate in the gravity direction, the mist flows locally into cells which are relatively close to the gas supply pipe. As a result, flooding occurs in these cells, deteriorating their performance. If the inlet manifold is not provided in the upper part of the separator plate, the mist remains in the inlet manifold, making the gas supply unstable. Further, the amount of gas supply may differ among the cells.

In the fuel cell disclosed by Japanese Laid-Open Patent Publication No. 2002-343400, the gas supply or exhaust pipe is misaligned with the projected surface of the manifold. This may possibly cause a wasteful region that does not contribute to the power generation in the separator plate surface. On the other hand, Japanese Laid-Open Patent Publication No. 2003-223922 merely specifies the arrangement of the outlet manifold. Therefore, a phenomenon ascribable to an inlet manifold may possibly occur to make the operations of the fuel cell unstable.

To address the above problems, the present invention provides a fuel cell which allows a substantially uniform gas supply to the unit cells in the cell stack. More specifically, the present invention provides a compact, highly reliable solid polymer fuel cell, substantially free from the adverse retention of condensed water in a manifold and capable of supplying a gas uniformly and stably without deteriorating or destabilizing the fuel cell performance.

SUMMARY OF THE DISCLOSURE

An advantage of the present invention is a polymer electrolyte fuel cell comprising a separator having supply and/or exhaust gas connections that minimizes water condensation within the cell.

According to the present invention, the foregoing and other advantages are achieved in part by a separator for a fuel cell having one or more gas channels connected to an inlet manifold on the separator. Advantageously, the lowermost part of any of the one or more gas flow channel connections that are made with the inlet manifold are above the uppermost part of a gas supply connection to the manifold.

In a preferred embodiment of the present invention, a fuel cell comprises a cell stack including a conductive polymer electrolyte membrane, a pair of electrodes sandwiching the membrane and a pair of conductive separator plates contacting each electrode. One of the separators has a gas flow channel for supplying and exhausting a fuel gas to and from one of the electrodes and the other has a gas flow channel for supplying and exhausting an oxidant gas to and from the other electrode. A feature of the present invention is that at least one of the gas flow channels is connected to the inlet manifold at a junction so that the lowermost part of that junction is located above a gas supply connection, e.g. a gas supply pipe connected to the inlet manifold. Advantageously the positional relationship between the gas flow channel connection on the inlet manifold and the gas supply connection is such that any condensed water introduced by the supply gas or otherwise is drawn by gravity away from the gas flow channel, which is above the supply connection.

Preferably, if two or more gas flow channels are connected to and in communication with the inlet manifold, than the lowermost part of the lowest one of the gas flow channels is positioned above the gas supply pipe connected to the inlet manifold in the gravity direction.

Other embodiments of the present invention include arranging the conductive separator plates parallel to the gravity direction; and providing the inlet manifold with a vertically oriented cross section.

In one aspect of the present invention, it is preferable that the junction of the gas supply pipe with the inlet manifold is positioned below the approximate vertical center of the inlet manifold.

It is also preferable that at least one of the gas flow channels of the conductive separators and a gas exhaust pipe are connected to an outlet manifold so that junctions of the gas flow channel and the gas exhaust pipe with the outlet manifold are positioned in a lower part of the outlet manifold.

In another embodiment the present invention, the inlet manifold has a narrowed portion (i.e. a constriction) between its top and bottom, e.g., between the gas supply pipe and the lowermost part of the gas flow channel connected thereto as can be viewed in a cross section of the manifold.

In another embodiment of the present invention, the gas supply pipe is extended into the inlet manifold. The extended part of the gas supply pipe can have one or more holes formed in the top thereof and the plurality of holes can be formed at decreasing intervals inwardly, i.e. from an opening of the inlet manifold to further within the cell stack, on the top portion of the pipe.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

The various features and advantages of the present invention will become more apparent and facilitated by reference to the accompanying drawings, submitted for purposes of illustration and not to limit the scope of the invention, where the same numerals represent like structure and wherein:

FIG. 13 is a front view showing a fuel cell of Embodiment 9 of the present invention, with an internal view of the cell.

DETAILED DESCRIPTION OF THE DISCLOSURE

Figure 1:
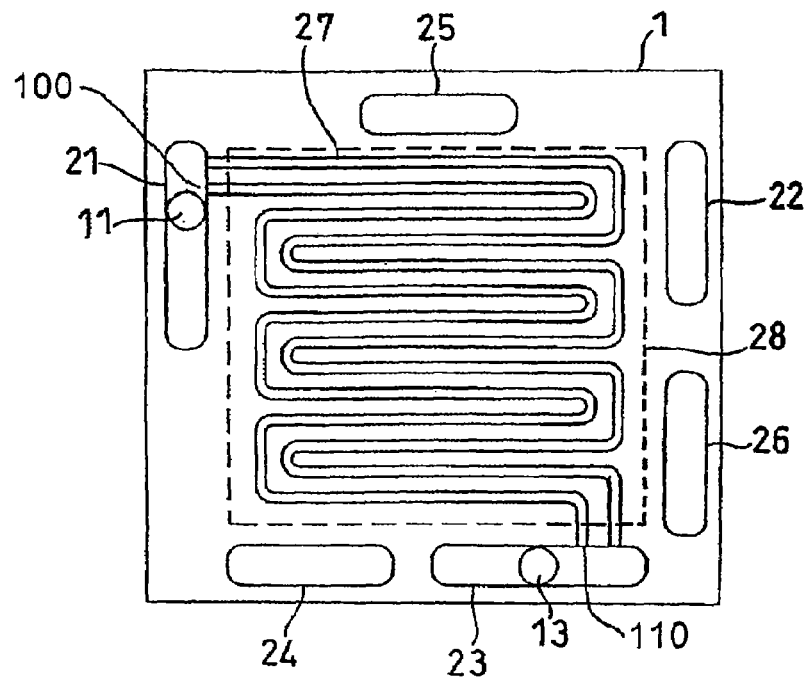
FIG. 1 is a front view showing a cathode-side surface of a conductive separator plate used in a fuel cell of Embodiment 1 of the present invention.

Although the presently disclosed configurations and arrangements are not limited to fuel cells, the present invention addresses the need to reduce the potential of water condensation in a fuel cell that employs humidified gas reactants. A feature of the present invention is that at least one of the gas flow channels of a separator is connected with an inlet manifold so that its lowermost junction with the inlet manifold is located above a gas supply pipe connected to the inlet manifold. The term above, as used herein, means that one feature or structure is above another with respect to gravity. This aspect allows a substantially uniform gas supply to be provided to each cell of a cell stack in a fuel cell. The cell configuration can also aid in preventing or reducing condensation of water and its retention in the manifold of a separator, thereby reducing or avoiding deterioration or destabilization of the fuel cell's performance.

Separators can be formed from a conductive material such as graphite. Flow channels and manifolds are typically formed on one or more faces of a plate of the separator by machining, milling or engraving. As is known in the art, a particular separator can be a bipolar, monopolar, anode cooler, cathode cooler, or a cooling plate.

In a conventional fuel cell in which separators have gas channels that have a serpentine configuration which are arranged substantially parallel to gravity and an inlet manifold for the gas supply is formed in an upper part of the separators in the gravity direction, the inlet manifold is generally oriented horizontally when viewed in cross section. A gas flow channel is connected to the bottom of the manifold. Accordingly, when a gas humidified to have almost 100% relative humidity is supplied, mist is generated by the condensation caused upstream of the cell stack and then supplied locally to the cells closer to the gas supply pipe, thereby causing flooding. Such flooding decreases the cell's performance.

In an embodiment of the present invention, the gas flow channel of the separator is connected to the inlet manifold at a position so that its connection with the inlet manifold is located above the gas supply pipe connected to the inlet manifold. By this arrangement, a more uniform gas supply to each unit cell can be realized. More specifically, the separator plates are arranged parallel to the direction of gravity (i.e., parallel to the force of gravity) and the inlet manifold is vertically oriented or has a vertically oriented part or portion when viewed in a cross section. Further, an inlet of the gas flow channel is connected to and in fluid communication with an upper part of the inlet manifold. Thereby, any mist generated can be reduced or substantially prevented from locally flowing into the cells closer to the gas supply pipe, which can further enhance the uniformity of the gas supply to the cells in a fuel cell stack.

If the cross section of the inlet manifold is vertically oriented, condensation may possibly occur upstream of the supplied gas flow in the fuel cell stack during long-term operation and the condensed water may be retained in the bottom of the inlet manifold. In this case, the manifold decreases its effective cross sectional area, increasing pressure loss for the whole gas flow channel and increasing the workload required for the gas supply. As a result, the whole system including the fuel cell stack decreases in efficiency. Retained water in the manifolds can cause pulsation of the supplied gas casing the gas supply to become unstable. To address this problem, an embodiment of the present invention provides a fuel cell having a gas supply pipe connected to a part of the inlet manifold below the center of the manifold, thereby preventing condensed water retention by making use of dynamic (variable) pressure of the supplied gas.

If the gas distribution is not uniform, variation in gas utilization ratio occurs among the unit cells. As a result, the cells may vary in performance. Therefore, for the purpose of uniforming the gas pressure in the inlet manifold, the inlet manifold is provided with a narrowed part or constriction between the gas supply pipe and the gas flow channel connection to the inlet manifold. By this configuration, the dynamic pressure in the inlet manifold can be maintained or returned to a static pressure and a more uniform gas supply to each cell can be achieved. Further, based on this theory, the uniform gas supply is also achieved by extending the gas supply pipe into the inlet manifold and forming holes on the top of the extended part of the pipe in the gravity direction.

Hereinafter, Embodiments of the present invention are explained with reference to the figures.

Embodiment 1

FIG. 1 is a front view showing a cathode-side surface of a separator according to an embodiment of the present invention, i.e., Embodiment 1. To form separator 1, a gas flow channel and manifold holes are machined or engraved isotropically from a graphite plate having the dimensions of about 220 mm long, about 220 mm wide and about 3 mm thick.

The separator 1 has an oxidant gas inlet manifold hole 21, an oxidant gas outlet manifold hole 23, a fuel gas inlet manifold hole 22 and a fuel gas outlet manifold hole 24, a cooling water inlet manifold hole 25 and a cooling water outlet manifold hole 26. The separator 1 further includes a gas flow channel 27 comprising two parallel grooves connecting the manifold holes 21 and 23 at 100 and 110 respectively on a cathode-side surface and another gas flow channel connecting the manifold holes 22 and 24 on an anode-side surface (not shown for illustrative convenience).

The grooves that function as the gas flow channels are sized to have a width of 2 mm and a depth of 2 mm, respectively. A region of the separator 1 demarcated by a broken line 28 comes into contact with an electrode and has a length of 150 mm and a width of 150 mm. The oxidant gas inlet manifold hole 21 is shaped into a rectangle of about 80 mm long and 15 mm wide, with corners thereof rounded. As viewed in FIG. 1, the manifold hole 21 is positioned above a horizontal center line of separator 1 by aligning a bottom side of the almost rectangular manifold hole 21 with the center line. The manifold hole 21 is designed to be approximately two times larger in area than the total cross sectional area of the oxidant gas flow channels of all separators when 50 cells are stacked.

If a cooling section is desired or required, a composite separator is used instead of the above-described separator, which serves as both a cathode-side separator and an anode-side separator. The composite separator is formed by combining a cathode-side separator and an anode-side separator provided with a cooling water flow channel on the rear surface, respectively, so that their cooling water flow channels are faced to each other.

Figure 2:
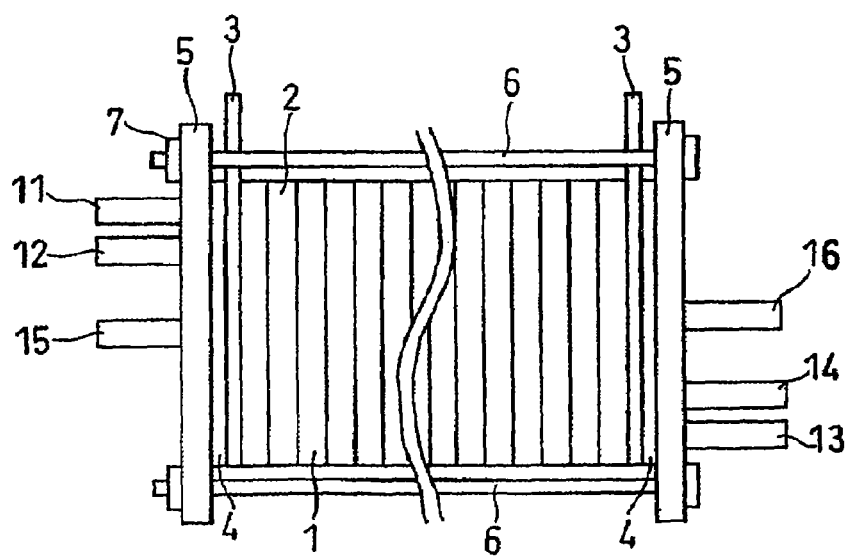
FIG. 2 is a side view showing the fuel cell of Embodiment 1 of the present invention.

FIG. 2 shows a fuel cell comprising a cell stack in which the above-described separators 1 and MEAs 2 are stacked alternately. In a typical fuel cell, the MEA is sandwiched between anode and cathode gas diffusion layers that can be formed from a resilient and conductive material such as carbon fabric or paper. The anode and cathode layers serve as electrochemical conductors between catalyzed sites of the membrane and the fuel (e.g., hydrogen) and oxidant (e.g., air/oxygen) which flow in respective anode and cathode flow channels of respective separator plates. A plurality of such MEA cells can be arranged in series to form a cell stack as shown in the figure.

An end plate 5 is arranged on each end of the cell stack with the intervening current collector plate 3 and an insulating plate 4, which are secured with fastening rods 6 and nuts 7 provided at both ends thereof. In this fuel cell, manifold holes are formed in the MEAs, the current collector plate, the insulating plate and the end plates to communicate with the manifold holes of the separator, respectively, which provide inlet and outlet manifolds for the oxidant gas, fuel gas and cooling water.

To one of the end plates are provided gas supply connections, e.g., oxidant gas supply pipe 11, fuel gas supply pipe 12 and cooling water supply pipe 15 are attached to communicate with the oxidant gas inlet manifold, the fuel gas inlet manifold and the cooling water inlet manifold, respectively. In a like manner, an oxidant gas exhaust pipe 13, a fuel gas exhaust pipe 14 and a cooling water drain pipe 16 are attached to the other end plate to communicate with the corresponding outlet manifolds, respectively.

The fuel cell is placed such that the cathode- and anode-surfaces of the separator 1 are vertical to the ground and the cooling water inlet manifold hole 25 is positioned upward. As shown in FIG. 1, the oxidant gas supply pipe 11 is attached to the end plate such that the pipe is positioned about one third from the top of the vertically oriented manifold hole 21. The gas flow channel 27 of the separator is designed such that inlet 100 thereof is positioned above the oxidant gas supply pipe 11. Further, in the lower part of the separator in the gravity direction, an outlet of the gas flow channel 110 is connected to and in communication with the outlet manifold hole 23, to which the oxidant gas exhaust pipe 13 is connected. Though not shown, the gas supply pipe and the inlet of the gas flow channel for the fuel gas, as well as the gas exhaust pipe and the outlet of the gas flow channel for the fuel gas are in the same positional relationship as those for the oxidant gas.

Embodiment 2

Figure 3:
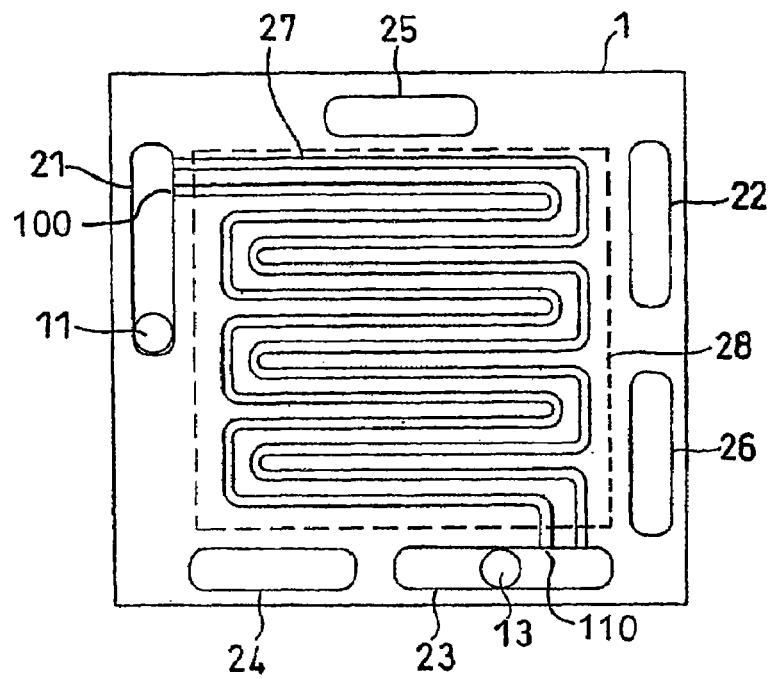
FIG. 3 is a front view showing a cathode-side surface of a conductive separator plate used in a fuel cell of Embodiment 2 of the present invention.

FIG. 3 is a front view showing a cathode-side surface of a separator according to Embodiment 2. A fuel cell of Embodiment 2 is the same as that of Embodiment 1 except that the oxidant gas supply pipe 11 is attached to the end plate so that the pipe is positioned about one tenth from the bottom of the manifold hole 21. The same reference numerals are given to the same components as those in Embodiment 1 and explanation thereof is omitted.

Embodiment 3

Figure 4:
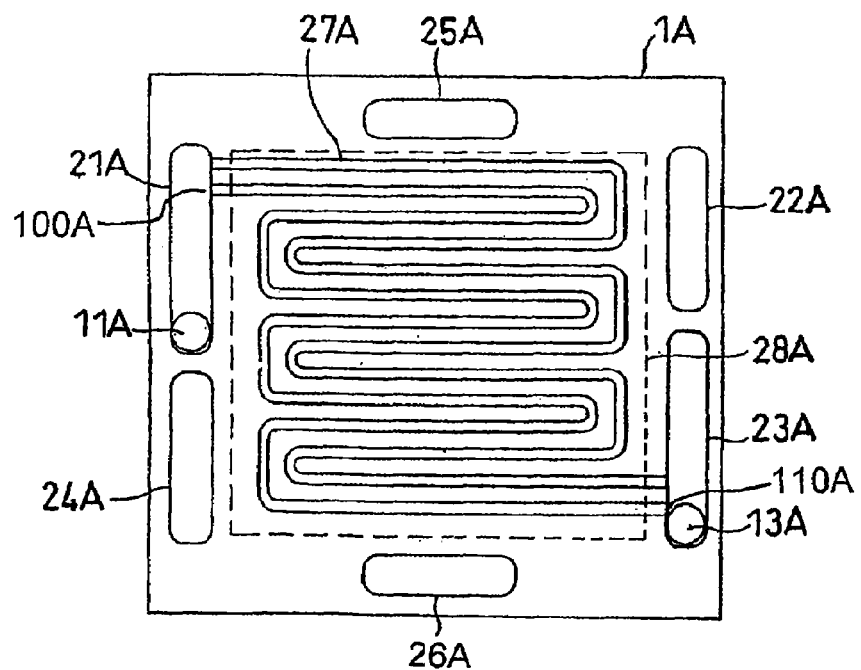
FIG. 4 is a front view showing a cathode-side surface of a conductive separator plate used in a fuel cell of Embodiment 3 of the present invention.

FIG. 4 is a cathode-side surface of a separator according to Embodiment 3. In a separator 1A, linear portions of an oxidant gas flow channel 27A are running from side to side as viewed in the figure. An inlet manifold hole 21A and an outlet manifold hole 23A are vertically oriented, respectively. An oxidant gas supply pipe 11A is positioned in the lower part of the manifold hole 21A, while an oxidant gas exhaust pipe 13A is attached to the end plate such that the pipe 13 comes to the same level as an outlet of the lower one of the two grooves serving as the gas flow channel. An inlet of the gas flow channel 27A is connected to manifold 21A at junction 100 A and is positioned above the pipe 11A. Also gas flow channel 27A is connected to outlet manifold 23A, which has gas exhaust pipe connection 13A. As shown in this embodiment, the junctions of the gas flow channel 110A and the gas exhaust pipe 13A are positioned in a lower part of outlet manifold 23A.

Embodiment 4

Figure 5:
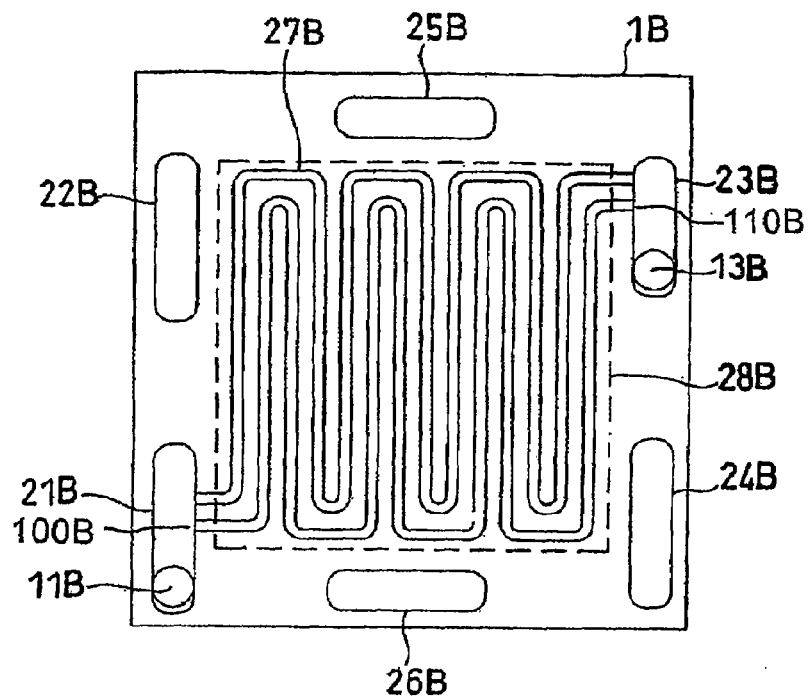
FIG. 5 is a front view showing a cathode-side surface of a conductive separator plate used in a fuel cell of Embodiment 4 of the present invention.

FIG. 5 is a front view showing a cathode-side surface of a separator according to Embodiment 5. In a separator 1B, linear portions of an oxidant gas flow channel 27B are running up and down as viewed in the figure. A gas supply pipe 11B and a gas exhaust pipe 13B are positioned in the lower parts of manifold holes 21B and 23B, respectively. A gas flow channel 27B has an inlet 100B and an outlet 110B connection positioned above the gas supply and exhaust pipes 11B and 13B, respectively.

Embodiment 5

Figure 6:
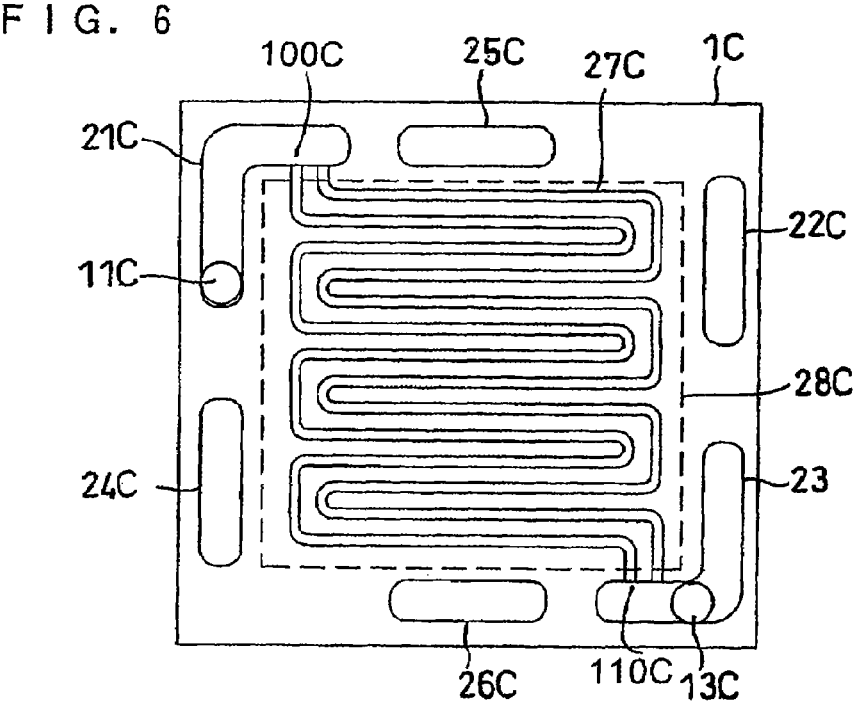
FIG. 6 is a front view showing a cathode-side surface of a conductive separator plate used in a fuel cell of Embodiment 5 of the present invention.

FIG. 6 is a front view showing a cathode-side surface of a separator according to Embodiment 5. A separator 1C includes an inlet manifold hole 21C and an outlet manifold hole 23C, both of which are L-shaped. A gas supply pipe 11C and a gas exhaust pipe 13C are positioned in the lower parts of the manifold holes 21C and 23C, respectively. A gas flow channel 27C connecting the manifold holes 21C and 23C has an inlet 100C and an outlet 110C connection positioned above the gas supply pipe 11C and the exhaust pipe 13C, respectively.

Embodiment 6

Figure 7:
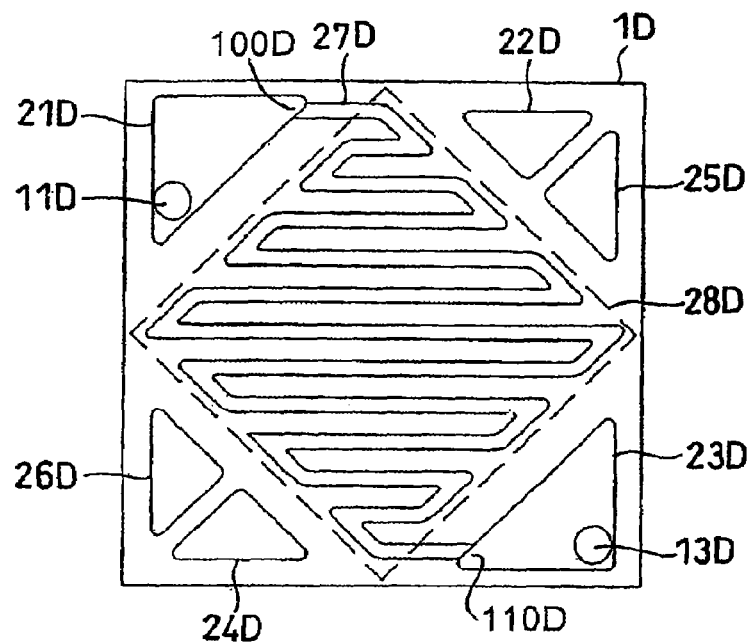
FIG. 7 is a front view showing a cathode-side surface of a conductive separator plate used in a fuel cell of Embodiment 6 of the present invention.

FIG. 7 is a front view showing a cathode-side surface of a separator according to Embodiment 6. In this embodiment, each of the manifold holes has a triangle shape. A separator 1D has an oxidant gas inlet manifold hole 21D, an oxidant gas outlet manifold hole 23D, a gas flow channel 27D connecting the manifold holes 21D and 23D, a fuel gas inlet manifold hole 22D, a fuel gas outlet manifold hole 24D, a cooling water inlet manifold hole 25D and a cooling water outlet manifold hole 26D. An oxidant gas supply pipe 11D is positioned in a lower part of the manifold hole 21D, while an oxidant gas exhaust pipe 13D is positioned in a lower part of the manifold hole 23D. The gas flow channel 27D has an inlet connection 100D positioned above the pipe 11D.

Embodiment 7

Figure 11:
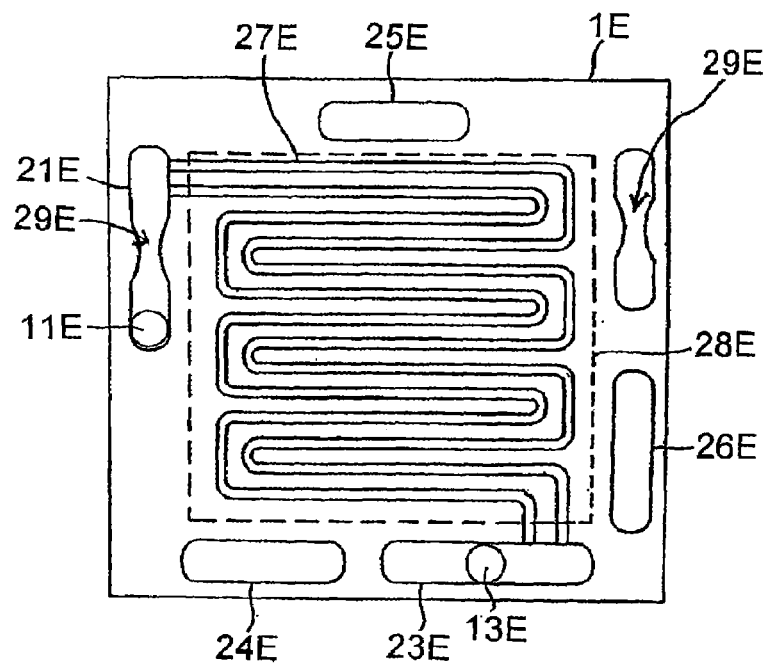
FIG. 11 is a front view showing a cathode-side surface of a conductive separator plate used in a fuel cell of Embodiment 7 of the present invention.

In this embodiment of the present invention, a separator for a fuel cell is provided comprising a gas channel connected to an inlet manifold on the separator. The inlet manifold has a top and bottom and a constriction between its top and bottom. The separator can have additional features. For example, FIG. 11 is a front view showing a cathode-side surface of a separator. Separator 1E includes an oxidant gas inlet manifold hole 21E, an oxidant gas outlet manifold hole 23E, a gas flow channel 27E connecting the manifold holes 21E and 23E, a fuel gas inlet manifold hole 22E, a fuel gas outlet manifold hole 24E, a cooling water inlet manifold hole 25E and a cooling water outlet manifold hole 26E. The inlet manifold holes 21E and 22E are provided with a narrowed part 29E between the gas supply pipe and the inlet 100E of the gas flow channel connected thereto, respectively, as an example of the location of a constriction in the inlet manifold.

Embodiment 8

Figure 12:
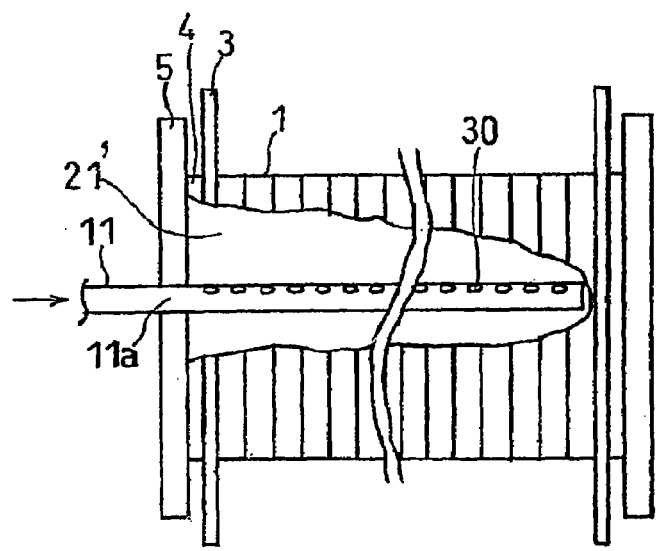
FIG. 12 is a front view showing a fuel cell of Embodiment 8 of the present invention, with a cut-out showing an internal view of the cell.

FIG. 12 is a front view showing a fuel cell according to Embodiment 8, with a cut-out view to show the inside of an oxidant gas inlet manifold 21'. A gas supply pipe 11 is increased in length so that the pipe is extended into the inlet manifold 21'. In the top of the extended pipe inserted in the inlet manifold 21', holes 30 of about 5 mm diameter for supplying gas are formed at 10 mm intervals. In FIG. 12, reference numeral 1 denotes a conductive separator, 2 an MEA, 3 a current collector plate, 4 an insulating plate and 5 an end plate.

Embodiment 9

FIG. 13 is a front view showing a fuel cell according to Embodiment 9, with a cut-out view to show the inside of an oxidant gas inlet manifold 21'. A gas supply pipe 11 is increased in length so that the pipe is extended into the inlet manifold 21'. In the top of the extended part inserted in the inlet manifold 21', holes 31 of about 5 mm diameter for supplying gas are formed. The holes 31 are arranged at decreasing intervals from an opening 11a of the inlet manifold 21 inwardly and toward the interior depth of the inlet manifold 21'. In FIG. 13, reference numeral 1 denotes a conductive separator, 2 an MEA, 3 a current collector plate, 4 an insulating plate and 5 an end plate.

EXAMPLES

Hereinafter, the present invention is explained by way of examples. These examples are intended to further illustrate certain preferred embodiments of the invention and are not limiting in nature. Those skilled in the art will recognize, or be able to ascertain, using no more than routine experimentation, numerous equivalents to the specific substances, procedures and assemblies described herein.

Example 1

The cathode catalyst comprised about 25% by weight platinum particles on acetylene black carbon powder (DENKA BLACK FX-35 available from Denka Kagaku Kogyo Kabushiki Kaisya). The platinum particles had an average particle diameter of about 30 Å. The anode catalyst comprised about 25% by weight platinum-ruthenium alloy particles on the acetylene black carbon powder. The platinum-ruthenium alloy particles had an average particle diameter of approximately 30 Å. Each of the catalyst powders was dispersed in isopropanol, which was then mixed with a dispersion of perfluorocarbon sulfonic acid powder in ethyl alcohol (Flemion FSS-1 available from Asahi Glass Co., Ltd.) to prepare a paste. These pastes were applied to one of the surfaces of nonwoven carbon cloth (TGP-H-090 available from Toray Industries, Inc.) of about 250 μM thick by screen printing, respectively, to form catalyst layers. Each of the catalyst layers of the thus obtained electrodes contained approximately 0.3 mg/cm$^2$ of catalytic metal and about 1.2 mg/cm$^2$ of perfluorocarbon sulfonic acid.

The obtained cathode and anode were identically configured except the kind of catalytic materials used. These electrodes were bonded to the center portions of both surfaces of a hydrogen ion conductive polymer electrolyte membrane (NAFION 112 available from E. I. DuPont de Nemours & Co., Ltd. USA) by hot pressing at 120° C. with 2.5 MPa pressure for about 10 minutes, respectively, so that the printed catalyst layers were in contact with the membrane. Then, fluorocarbon rubber sheet of 250 μm thick was cut into a predetermined size and arranged to sandwich the electrolyte membrane exposed on the periphery of the electrodes and bonded integrally by hot pressing to form an MEA. The hydrogen ion conductive polymer electrolyte membrane used was a 30 μm thick film of perfluorocarbon sulfonic acid.

In this Example, a conductive separator plate, such as one available from Tokai Carbon Co., Ltd., which is composed principally of conductive carbon, configured as explained in Embodiment 1 was used to form a fuel cell. The fuel cell was placed so that the conductive separator surface was vertical to the ground and the cooling water inlet manifold hole 25 was positioned upward (i.e. at the top of the cell). The separator was provided with a serpentine gas flow channel including horizontal linear portions and curved portions, along which a reaction gas flows downward in the gravity direction.

The conductive separators and the MEAs were stacked alternately. A cooling section for passing cooling water was provided between every two MEAs. After 50 MEAs were stacked, an end plate made of stainless steel (SUS316) was arranged to each end of the cell stack with an intervening current collector plate, which was made of gold-plated copper having a thickness of about 3 μm, and an insulating plate made of polyphenylene sulfide. The assembly was secured by fastening rods at either end of the stack. The fastening pressure at that time was 10 kgf/cm$^2$ per area of the electrode.

As shown in FIG. 2, supply pipes were attached to one of the end plates of the fuel cell stack to supply reaction gases and cooling water to the manifolds in the fuel cell stack, while exhaust pipes were attached to the other end plate. However, the supply pipes may be turned in the fuel stack so that the gases and cooling water are supplied and exhausted from the same end plate side.

Comparative Example 1

Figure 8:
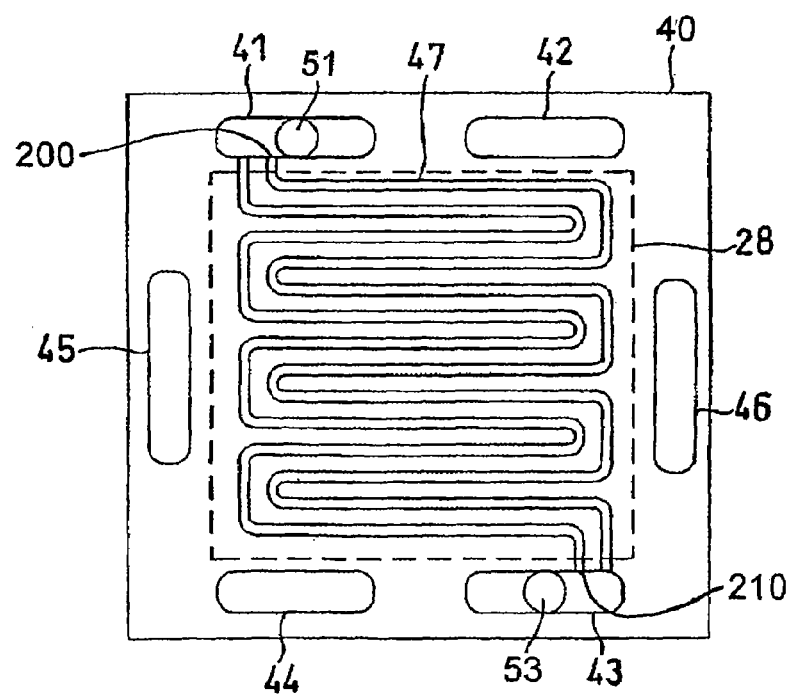
FIG. 8 is a front view showing a cathode-side surface of a conductive separator plate used in a fuel cell of Comparative Example 1.

FIG. 8 shows a conductive separator of a comparative fuel cell. A separator 40 includes an oxidant gas inlet manifold hole 41, an oxidant gas outlet manifold hole 43, a fuel gas inlet manifold hole 42, a fuel gas outlet manifold hole 44, a cooling water inlet manifold hole 45 and a cooling water outlet manifold hole 46. The separator 40 further includes a gas flow channel 47 comprising two parallel grooves connecting the manifold holes 41 and 43 at 200 and 210 respectively on the cathode side and another gas flow channel connecting the manifold holes 42 and 44 on the anode side. As shown in FIG. 8, an oxidant gas supplied from an oxidant gas supply pipe 51 to the inlet manifold 41 positioned in an upper part of the separator 40 flows downward in the gravity direction and exhausted through the outlet manifold hole 43 to a gas exhaust pipe 53. In a like manner, a fuel gas is supplied to the inlet manifold hole 42 to pass through the gas flow channel and exhausted out of an exhaust pipe via the outlet manifold hole 44.

Figure 9:
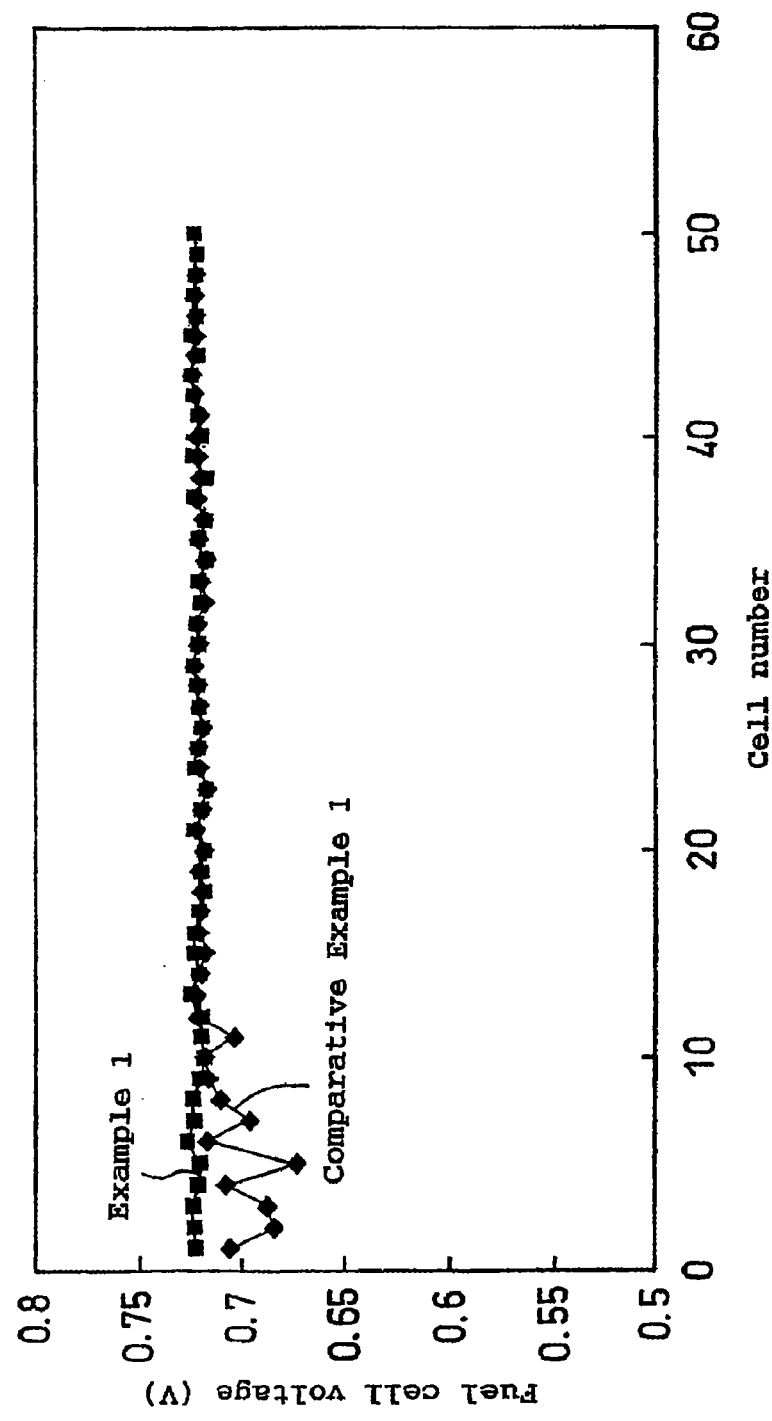
FIG. 9 is a graph comparing voltages of unit cells in the fuel cells of Example 1 and Comparative Example 1.

The solid polymer fuel cells of Example 1 and Comparative Example 1 were kept at 75° C. Then, a fuel gas (80% hydrogen gas/20% carbon dioxide/10 ppm carbon monoxide) heated and humidified to have a dew point of 75° C. was supplied to the anode and air heated and humidified to have a dew point of 75° C. was supplied to the cathode to perform rated operation. The rated operation was carried out under the fuel utilization ratio of 75%, the oxygen utilization ratio of 40% and the current density of 0.3 A/cm$^2$. The utilization ratio and the power generation of the fuel cell depends on the chemical reaction of: $H_2 + \frac{1}{2}O_2$ to $H_2O$. If all of the supplied hydrogen is reacted, the utilization ratio is 100%. In general, however, about 30% of the supplied hydrogen in not reacted but discharged due to various reasons. A graph of FIG. 9 compares voltages of the unit cells in the fuel cells, in which the cell number counted from the gas supply inlet side was taken on the horizontal axis.

The fuel cell of Comparative Example 1 showed an irregular decrease in performance of the unit cells closer to the gas supply pipe. The fuel cell of Comparative Example 1 was configured so that the gas was supplied to the gas flow channel of the separator via the pipe connected to the lower part of the inlet manifold. Accordingly, part of the gas supplied at high humidity caused condensation upstream of the cell stack and the condensed water flowed into the gas flow channels of the separators closer to the gas supply pipe. Therefore, flooding occurred and hence the cell performance decreased. On the other hand, in the fuel cell of Example 1, the gas flow channel communicated with the gas inlet manifold hole was positioned above the gas supply pipe connected to the manifold hole in the gravity direction. Therefore, the mist was temporarily trapped in the manifold hole, avoiding the mist from being supplied locally to certain cells. In this respect, the fuel cell of Example 1 was confirmed as effective.

Example 2

Figure 10:
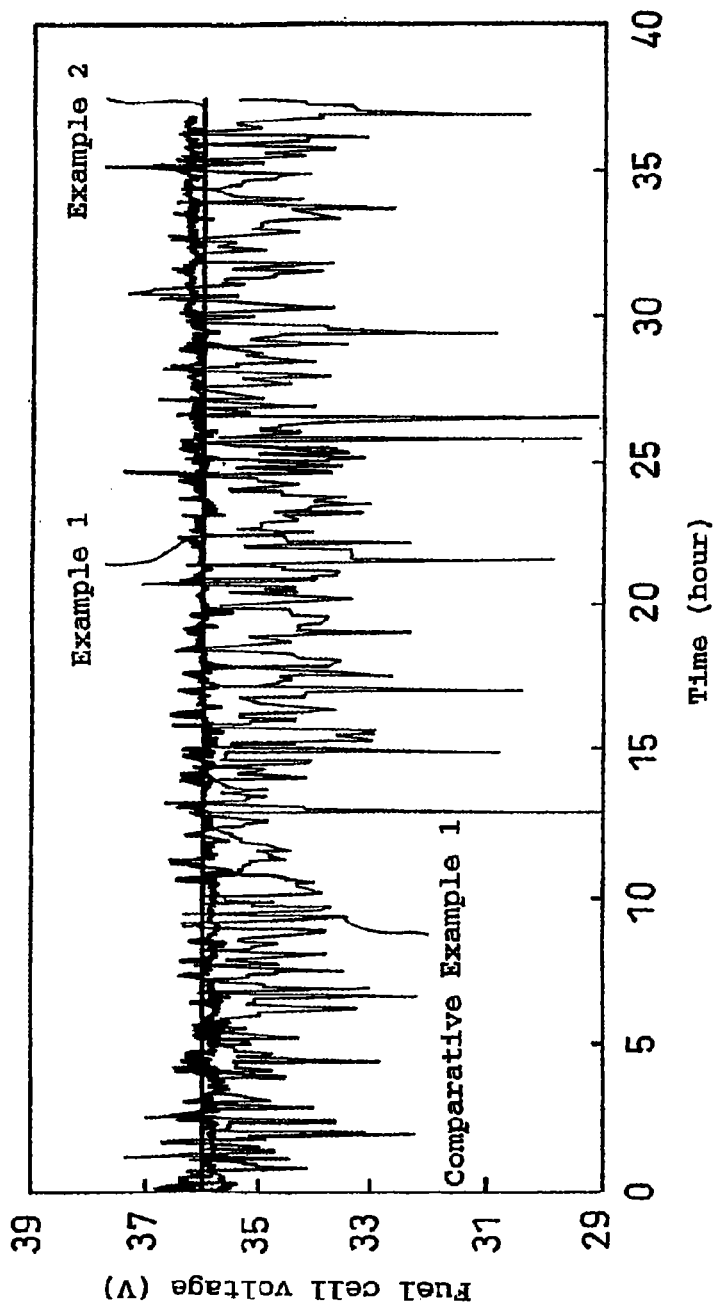
FIG. 10 is a graph showing variation in voltage of the fuel cells of Examples 1 and 2 of the present invention and Comparative Example 1 during continuous operation.

A fuel cell was formed in the same manner as Example 1 except that the gas supply pipe connected to the inlet manifold was positioned about one tenth from the bottom of the inlet manifold as explained in Embodiment 2 with reference to FIG. 3. The fuel cells of Examples 1 and 2 were subjected to the rated operation under the same conditions as described in Example 1. FIG. 10 shows the results.

The performance of the fuel cell of Example 1 showed a pulsated waveform, in which a momentary decrease was observed occasionally. On the other hand, the fuel cell of Example 2 showed stable performance. Since the fuel cell of Example 1 was provided with the gas supply pipe positioned one third from the top of the inlet manifold, water condensed in the gas supply pipe was retained in the lower part of the manifold. The retained water caused pulsation of the supply gas pressure or flowed irregularly into the gas flow channel to temporarily block the gas flow channel. Thereby, the cell voltage decreased. In the fuel cell stack of Example 1, pressure loss in the whole gas flow channels in the fuel cell was larger than the set value by 30%, which decreased the efficiency of the whole fuel cell system. On the other hand, in the fuel cell of Example 2, the pressure loss value was as predicted. Therefore, it was confirmed that the fuel cell was operated without causing the water retention in the manifold.

The water retention leading to unstable operations of the fuel cell was substantially reduced when the gas supply pipe connected to the inlet manifold was positioned anywhere below the approximate vertical center of the inlet manifold.

In this example, the gas was passed downward in the gravity direction and the manifold was vertically oriented. However, stable fuel cell performance was also achieved with use of a separator of FIG. 5 configured to pass the gas upward in the gravity direction or separators of FIGS. 6 and 7 having manifolds of different shapes.

Example 3

Using the separator according to Embodiment 6 shown in FIG. 7, a fuel cell was formed. After the rated operation of the fuel cell, it was confirmed that the fuel cell showed more reliable performance for a long time than the fuel cell of Example 2. In the fuel cell of Example 2, the outlet of the gas flow channel was connected to the upper part of the outlet manifold, thereby causing temporary retention of condensed or generated water in the lower part of the manifold through continuous operation. Accordingly, the reaction gas pressure in the cell stack was pulsated to destabilize the fuel cell performance. However, in the fuel cell of Example 3, the outlet of the gas flow channel and the gas exhaust pipe were connected to the lower part of the manifold. Therefore, the retention of condensed or generated water was prevented at all times by making use of dynamic pressure of unreacted gas, which allowed exhaustion of the gas and water with stability.

When the gas exhaust pipe for exhausting the unreacted gas to the outside was connected to the center of the outlet manifold of the cell stack adopting the separator of FIG. 7, the retention of condensed or generated water was inevitably caused in the lower part of the manifold, making the fuel cell performance unstable. However, the fuel cell of Example 3 did not cause the water retention because the gas exhaust pipe was connected to the lower part of the manifold. Thereby, the fuel cell performance surely remained stable.

Example 4

Using the separator of Embodiment 7 shown in FIG. 11, a fuel cell was formed. After the rated operation of the fuel cell, it was confirmed that the fuel cell showed more reliable performance for a long time than the fuel cell of Example 2. In the fuel cell of Example 2, the gas distribution from the inlet manifold 21 to the gas flow channels was not completely uniform and the cells were varied in gas utilization ratio. On the other hand, the fuel cell of Example 4 was provided with the inlet manifold shaped to have a narrowed part between the gas supply pipe and the lowermost part of the junction of the gas flow channel with the inlet manifold. Therefore, the gas pressure in the inlet manifold was kept uniform and the dynamic pressure in the inlet manifold was returned to the static pressure. Thereby, the gas was supplied uniformly to each cell.

Example 5

A fuel cell was formed in the same manner as Example 1 except that the gas supply pipe was extended into the oxidant gas inlet manifold as shown in FIG. 12. Holes 30 of 5 mm diameter for supplying gas were formed at 10 mm intervals in the top surface of the extended part of the pipe. After the rated operation of the fuel cell, it was confirmed that the fuel cell showed more reliable performance for a longer time than the fuel cell of Example 1. In the fuel cell of Example 1, the gas distribution from the inlet manifold 21 to the gas flow channels was not completely uniform and the cells were varied in gas utilization ratio. On the other hand, in the fuel cell of Example 5, the gas supply pipe was extended into the inlet manifold and the holes were provided in the top of the extended part of the pipe in the gravity direction. Therefore, the gas pressure in the inlet manifold was kept uniform and the dynamic (variable) pressure in the inlet manifold was recovered to the static pressure. Thereby, the gas was uniformly supplied to each cell.

Example 6

A fuel cell was formed in the same manner as Example 5 except that 20 holes 31 of 5 mm diameter for supplying gas were formed in the top surface of the extended part of the pipe at decreasing intervals from an opening 11a of the inlet manifold toward the depth of the inlet manifold 21. More specifically, the holes were formed at decreasing intervals of 10 mm from the first hole to the sixth hole, 8 mm from the sixth hole to eleventh hole, 6 mm from the eleventh hole to the sixteenth hole, and 4 mm from the sixth hole to twentieth hole. After the rated operation of the fuel cell, it was confirmed that the fuel cell showed more reliable performance for a longer time than the fuel cell of Example 5 because the uniform gas distribution from the inlet manifold 21 to the gas flow channels was also achieved in Example 6 and the pressure loss of the supplied gas was prevented even in the depth of the inlet manifold by decreasing the intervals between the holes.

In Examples above, the gas supply pipe, the inlet of the gas flow channel and the inlet manifold are arranged in a certain positional relationship and so are the gas exhaust pipe, the outlet of the gas flow channel and the outlet manifold on both of the cathode- and anode-side surfaces. However, similar degree of effect is obtained even if such a positional relationship is established only on the anode- or the cathode-side surface. Although the present invention is explained by referring to a fuel cell adopting an internal manifold, the invention is also applicable to a fuel cell adopting an external manifold.

According to the present invention as described above, gas supply to the whole unit cells in a cell stack is achieved uniformly and retention of condensed water in a manifold is avoided. Thereby, the fuel cell performance is prevented from being deteriorated or unstabled. Thus, improvement in fuel cell reliability is achieved.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A polymer electrolyte fuel cell comprising a cell stack comprising a plurality of cells including a hydrogen ion conductive polymer electrolyte membrane, a pair of electrodes sandwiching said membrane and a pair of conductive separators, one of which has a gas flow channel for supplying and exhausting a fuel gas to and from one of said electrodes and the other has a gas flow channel for supplying and exhausting an oxidant gas to and from the other electrode, wherein at least one of said gas flow channels is connected to an inlet manifold at a junction, the lowermost part of said junction is positioned above a gas supply pipe connected to said inlet manifold, and said gas supply pipe is extended into said inlet manifold beyond an end plate located at a nearest end of said cell stack in the laminating direction of said cell stack, and an extended part of said gas supply pipe has a plurality of holes in the top thereof, which are spaced apart at decreasing intervals inwardly.

2. The polymer electrolyte fuel cell in accordance with claim 1, wherein said at least one gas flow channel has a serpentine configuration which is arranged substantially parallel to gravity.

3. The polymer electrolyte fuel cell in accordance with claim 1, wherein said inlet manifold has a vertically oriented cross section.

4. The polymer electrolyte fuel cell in accordance with claim 1, wherein a junction of said gas supply pipe with said inlet manifold is positioned below the center of said inlet manifold.

5. The polymer electrolyte fuel cell in accordance with claim 1, wherein said at least one of said gas flow channel is connected to an outlet manifold, which has a gas exhaust pipe connection, and wherein the junctions of said gas flow channel and said gas exhaust pipe with said outlet manifold are positioned in a lower part of said outlet manifold.

6. The polymer electrolyte fuel cell in accordance with claim 1, wherein said inlet manifold has a constriction between said gas supply pipe connection and said lowermost part of said gas flow channel connected.

* * * * *